(12) United States Patent
Kim

(10) Patent No.: US 9,154,177 B2
(45) Date of Patent: Oct. 6, 2015

(54) METHOD FOR CONTROLLING TRANSMISSION/RECEPTION TIMING OF BASE STATION ANTENNA FOR TDD WIRELESS COMMUNICATIONS AND BASE STATION ANTENNA USING THE SAME

(75) Inventor: Duk-Yong Kim, Gyeonggi-do (KR)

(73) Assignee: KMW Inc., Hwaseong, Gyeonggi-Do (KR)

( * ) Notice: Subject to any disclaimer, the term of this patent is extended or adjusted under 35 U.S.C. 154(b) by 116 days.

(21) Appl. No.: 13/265,276

(22) PCT Filed: Apr. 16, 2010

(86) PCT No.: PCT/KR2010/002387
§ 371 (c)(1),
(2), (4) Date: Oct. 19, 2011

(87) PCT Pub. No.: WO2010/123229
PCT Pub. Date: Oct. 28, 2010

(65) Prior Publication Data
US 2012/0033559 A1 Feb. 9, 2012

(30) Foreign Application Priority Data

Apr. 20, 2009 (KR) ........................ 10-2009-0034399

(51) Int. Cl.
H04W 24/00 (2009.01)
H04B 1/48 (2006.01)
H04B 1/18 (2006.01)
H04B 1/54 (2006.01)
H04W 88/08 (2009.01)

(52) U.S. Cl.
CPC .. *H04B 1/48* (2013.01); *H04B 1/18* (2013.01); *H04B 1/54* (2013.01); *H04W 88/085* (2013.01)

(58) Field of Classification Search
USPC ................ 370/335, 342, 294, 350; 455/553.1
See application file for complete search history.

(56) References Cited

U.S. PATENT DOCUMENTS

| | | | | |
|---|---|---|---|---|
| 6,356,536 B1 * | 3/2002 | Repke | ............................ | 370/282 |
| 6,396,823 B1 * | 5/2002 | Park et al. | ...................... | 370/335 |
| 6,470,001 B1 * | 10/2002 | Kim et al. | ..................... | 370/342 |
| 6,839,333 B1 * | 1/2005 | Akerberg | ....................... | 370/330 |
| 2004/0213200 A1 * | 10/2004 | Saw | ............................... | 370/350 |
| 2006/0121937 A1 * | 6/2006 | Son | ............................ | 455/553.1 |
| 2008/0056167 A1 * | 3/2008 | Kim et al. | ..................... | 370/294 |

FOREIGN PATENT DOCUMENTS

CN 1622481 A 6/2005
CN 1787390 A 6/2006
(Continued)

*Primary Examiner* — Kevin C Harper
*Assistant Examiner* — Derrick V Rose
(74) *Attorney, Agent, or Firm* — Mintz Levin Cohn Ferris Glovsky and Popeo, P.C.; Kongsik Kim; Colleen H. Witherell

(57) ABSTRACT

A method for controlling a transmission/reception timing of a BS antenna for TDD wireless communications is provided, in which a control signal and an RF signal are separated from a modulated signal received from a BTS, a TDD synchronization signal is monitored from the received modulated signal, a periodic RF signal is checked from downlink transmission and uplink reception RF signals, an error between the TDD synchronization signal and the periodic RF signal is calculated, and a transmission/reception switching control signal is output according to the error.

18 Claims, 4 Drawing Sheets

(56) References Cited  * cited by examiner

FOREIGN PATENT DOCUMENTS

| | | | | |
|---|---|---|---|---|
| JP | 2009-272732 A | 11/2009 | | |
| KR | 2005-102594 | 10/2005 | ............... | H04B 1/59 |
| KR | 2006-057132 | 5/2006 | ............... | H04B 7/14 |

METHOD FOR CONTROLLING TRANSMISSION/RECEPTION TIMING OF BASE STATION ANTENNA FOR TDD WIRELESS COMMUNICATIONS AND BASE STATION ANTENNA USING THE SAME

TECHNICAL FIELD

The present invention generally relates to a method for controlling a Base Station (BS) antenna in a mobile communication system and a BS antenna using the same. More particularly, the present invention relates to a method for controlling the transmission/reception timing of a BS antenna for Time Division Duplexing (TDD) wireless communications and a BS antenna using the same.

BACKGROUND ART

In a TDD wireless communication system that distinguishes transmission from reception by time-division of the same frequency, a Transmit/Receive Antenna Switch (TRAS) for switching between a high-power Radio Frequency (RF) transmission signal and a low-power RF reception signal protects a Low Noise Amplifier (LNA) at a receiver by blocking transmit power from the LNA in transmission mode and reduces noise introduced from a transmitter in reception mode. To implement the TRAS function, an RF switch is usually used, of which the switching is controlled based on a TDD synchronization signal. However, it may occur that the transmission/reception timing of the TDD synchronization signal is not identical to that of the RF transmission/reception signal in a BS. Then a downlink RF transmission signal whose power was amplified much may be introduced into the uplink reception path of a reception signal amplification/division module 70 and devices residing in the uplink reception path, such as an LNA may be damaged. To avoid this problem, an isolator is inserted at the output end of the LNA in hardware. However, if the isolator is damaged, the highly power-amplified downlink transmission RF signal may be introduced into the LNA, resulting in damage to the LNA.

DISCLOSURE

Technical Problem

An aspect of exemplary embodiments of the present invention is to address at least the problems and/or disadvantages and to provide at least the advantages described below. Accordingly, an aspect of exemplary embodiments of the present invention is to provide a method for controlling the transmission/reception timing of a BS antenna for TDD wireless communications to prevent damage to devices located in an uplink reception path.

Technical Solution

In accordance with an aspect of exemplary embodiments of the present invention, there is provided a method for controlling a transmission/reception timing of a BS antenna for TDD wireless communications, in which a control signal and an RF signal are separated from a modulated signal received from a BTS, a TDD synchronization signal is monitored from the received modulated signal, a periodic RF signal is checked from downlink transmission and uplink reception RF signals, an error between the TDD synchronization signal and the periodic RF signal is calculated, and a transmission/reception switching control signal is output according to the error.

In accordance with another aspect of exemplary embodiments of the present invention, there is provided a BS antenna device for TDD wireless communications, in which a signal separator separates an RF signal, a control signal for antenna control, and an operation power from a signal received from a BTS, a division/phase shift module divides the RF signal received from the signal separator, shifts a phase of each of the divided signals according to a phase control signal, and outputs the phase-shifted signals to a reception signal amplifier, a coupler generates a signal coupled with the signal received from the BTS or the separated RF signal in an RF signal path, an RF detector detects the RF signal from the coupled signal, a converter receives the operation power from the signal separator and provides the operation power to the reception signal amplifier, the reception signal amplifier is connected to a radiation element of the BS antenna and amplifies an uplink signal received from the radiation element, and outputs the amplified uplink signal, and an MCM receives the control signal and the operation power from the signal separator, monitors a TDD synchronization signal from the control signal, checks a periodic RF signal from the RF signal detected by the RF detector, calculates an error between the TDD synchronization signal and the periodic RF signal, outputs a transmission/reception switching control signal according to the error, and outputs the phase control signal according to the status of the RF signal.

Advantageous Effects

As is apparent from the above description, the method for controlling the transmission/reception timing of a BS antenna for TDD wireless communications according to the present invention enables stable control of transmission/reception switching and prevents damage to devices located in an uplink reception path.

DESCRIPTION OF DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

BEST MODE

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
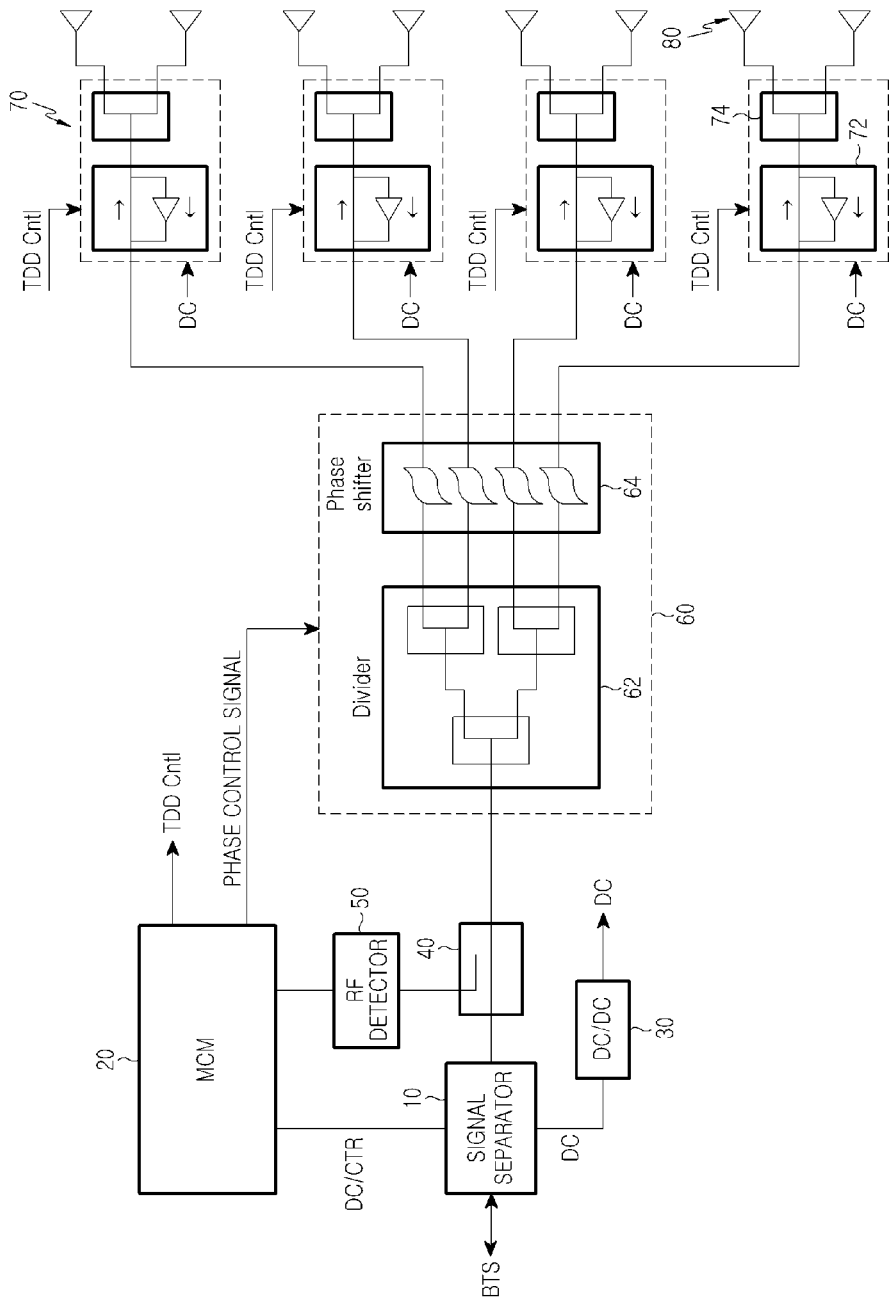
FIG. 1 is an overall block diagram of a BS antenna in a TDD mobile communication system according to an exemplary embodiment of the present invention.

FIG. 1 is an overall block diagram of a BS antenna in a TDD mobile communication system according to an exemplary embodiment of the present invention. Referring to FIG. 1, a Base Transceiver Station (BTS) combines and amplifies an RF signal, a control signal for controlling an antenna, and a Direct Current (DC) power and transmits the amplified signal to the BS antenna according to the exemplary embodiment of the present invention, by way of example. Also, the BS antenna according to the exemplary embodiment of the present invention is basically configured such that it does not have Tower Mounted Amplifier (TMA) and is connected directly to the BTS.

The BS antenna includes a signal separator 10 with a bias-T, for separating the RF signal, the control signal for antenna control, and the DC power from the BTS, and a division/phase shift module 60 for primarily dividing the RF signal received from the signal separator 10 at 1:N (1:4 in FIG. 1) at a divider 62 and shifting the phase of each of the divided signals at a phase shifter 64.

The BS antenna is further provided with reception signal amplification/division modules 70 each having at least one reception signal amplifier 72 for receiving a signal from the division/phase shift module 60, transmitting the received signal to at least one radiation element 80 according to a TDD control signal, TDD Cntl, filtering an uplink signal received from the at least one radiation element 80 in a predetermined reception band, and amplifying the filtered uplink signal at an LNA, and at least one radiation element-front end divider 74 for secondarily dividing the signal received from the at least one reception signal amplifier 72 at 1:M (1:2 in FIG. 1) and outputting the divided signals to predetermined radiation elements 80. It will be appreciated that a final division ratio determined based on the division ratio 1:N in the divider 62 of the division/phase shift module 60 and the division ratio 1:M in the radiation element front-end divider 74 of the reception signal amplification/division module 70 depends on the number of radiation elements of the BS antenna.

The BS antenna also includes an RF coupler 40 for generating a signal coupled with the RF signal in an RF path between the signal separator 10 and the division/phase shift module 60, an RF detector 50 for detecting the RF signal from the coupled signal, and a DC/DC converter 30 for receiving the DC power from the signal separator 10 and supplying an operation power to the LNA of each reception signal amplification/division module 70.

The BS antenna further has a Main Control Module (MCM) 20 for receiving the control signal and the DC power from the signal separator 10, analyzing the status of the RF signal detected by the RF detector 50, and outputting a phase control signal to the phase shifter 64 of the division/phase shift module 60 accordingly.

To control the transmission/reception timing of each reception signal amplification/division module 70, the MCM 20 generates a TDD control signal TDD Cntl and transmits it to the reception signal amplification/division module 70.

Figure 2:
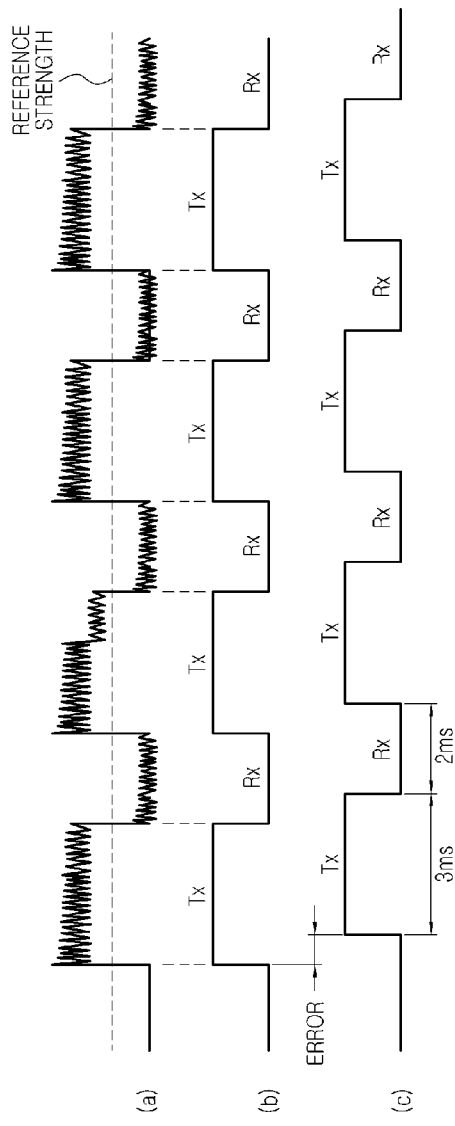
FIG. 2 is a diagram illustrating the transmission and reception timings of a TDD synchronization signal and an RF signal according to an exemplary embodiment of the present invention.

FIG. 2 is a diagram illustrating the transmission and reception timings of a TDD synchronization signal and an RF signal according to an exemplary embodiment of the present invention. FIG. 2(a) illustrates an RF signal transmitted and received in the BS antenna, FIG. 2(b) illustrates a periodic RF signal based on the RF signal illustrated in FIG. 2(a), and FIG. 2(c) illustrates a TDD synchronization signal of a modulated signal received from the BTS.

Referring to FIG. 2, the TDD control signal TDD Cntl provided to each reception signal amplification/division module 70 is generally produced simply based on the TDD synchronization signal of the modulated signal received from the BTS, illustrated in FIG. 2(c). However, it may occur that the TDD synchronization signal is not synchronous to the RF signal illustrated in FIG. 2(b), transmitted and received in the BS antenna. Therefore, an amplified downlink RF transmission signal may be introduced into the uplink reception path of the reception signal amplification/division module 70, thus damaging an isolator or the LNA in the uplink reception path.

Accordingly, the MCM 20 in the BS antenna of the present invention generates the TDD control signal, TDD Cntl by directly monitoring the TDD synchronization signal corresponding to the time-division timings of the modulated signal received from the BTS and the downlink transmission timing and uplink reception timing of the RF signal. That is, the MCM 20 checks the downlink transmission timing and uplink reception timing of the periodic RF signal by monitoring the TDD synchronization signal corresponding to the time-division timings of the BTS and the strength of the RF signal detected by the RF detector 50. The MCM 20 then calculates the error between the TDD synchronization signal and the periodic RF signal and if the error exceeds an allowed range (e.g. 0 to 20 s), it generates the TDD control signal TDD Cntl fixed to transmission mode.

While it has been described that if the error exceeds an allowed range (e.g. 0 to 20 s), the TDD control signal TDD Cntl is fixed to the transmission mode in the exemplary embodiment of the present invention, to which the present invention is not limited, those skilled in the art will appreciate that many modifications can be made. That is, the TDD control signal TDD Cntl is used for preventing damage to the isolator or the LNA of the reception signal amplification/division module 70. Thus, it suffices to configure the TDD control signal such that the downlink RF transmission signal is not introduced into the uplink reception path in which the isolator or the LNA resides. In this context, the TDD control signal TDD Cntl is sufficient as long as it is configured so that the reception signal amplification/division module 70 is maintained in the transmission mode at least during a downlink RF transmission period.

Figure 3:
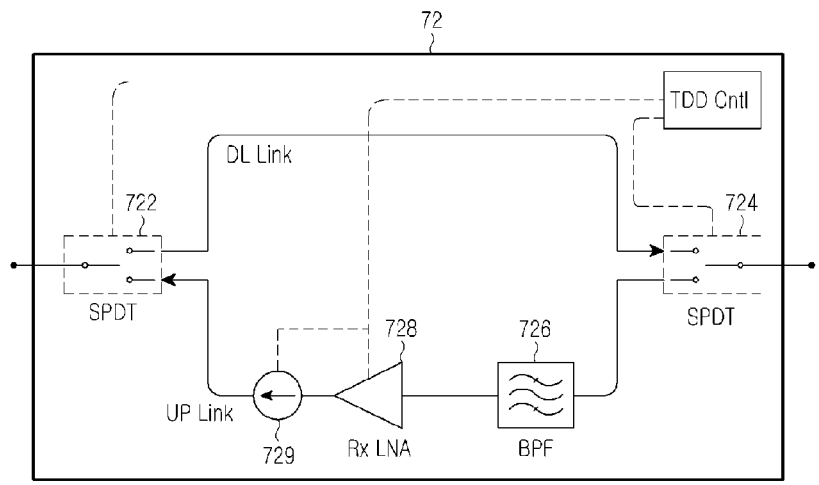
FIG. 3 is a detailed block diagram of a reception signal amplifier in a reception signal amplification/division module illustrated in FIG. 1 according to an exemplary embodiment of the present invention.

FIG. 3 is a detailed block diagram of a reception signal amplifier in a reception signal amplification/division module illustrated in FIG. 1 according to an exemplary embodiment of the present invention;

Referring to FIG. 3, the reception signal amplifier 72 includes a first switch 722 connected to the division/phase shift module 60, for switching to a transmission/reception path according to the TDD control signal, TDD Cntl, a second switch 724 connected to a radiation element 80, for switching to the transmission/reception path according to the TDD control signal, TDD Cntl, a Band Pass Filter (BPF) 726 for passing only a signal of a predetermined reception band in a signal received from the second switch 724 during reception, and an LNA 728 for low-noise-amplifying the signal received from the BPF 726.

In FIG. 3, the first and second switches 722 and 724 are Single Pole Double Through (SPDT) switches, by way of example, to which the present invention is not limited. Instead, Single Pole Single Through (SPST) switches may be adopted as the first and second switches 722 and 724. Also, the first and second switches 722 and 724 may be configured with PIN diodes, transistors (e.g. GaAs Field Effect Transistors (FETs)), etc.

During RF transmission in the reception signal amplifier 72, the first and second switches 722 and 724 switch to the transmission path according to the TDD control signal TDD Cntl and thus an RF transmission signal is transmitted to the radiation element 80 through the first and second switches 722 and 724.

During RF reception, the first and second switches 722 and 724 switch to the reception path according to the TDD control signal TDD Cntl and thus a signal received from the radiation element 80 is provided to the BPF 726 through the second switch 724. The BPF 726 filters only a signal in the predetermined reception frequency band from the received signal. The LNA 728 low-noise-amplifies the filtered signal and provides the amplified signal to the BTS through the first switch 722.

As described above, because a signal received through the radiation element 80 is amplified at the nearby LNA 728 connected to the radiation element 80, signal loss is minimized. Compared to a conventional BS antenna, the received signal is amplified before it is added with noise in the internal transmission path of the antenna, the amplification efficiency of a valid signal is further increased. In addition, signal loss can be minimized during signal transmission because there is no particular device in the transmission path.

Figure 4:
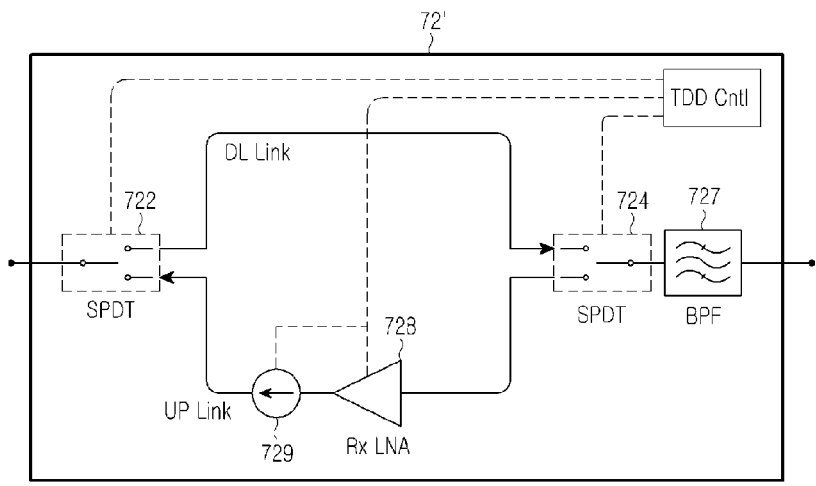
FIG. 4 is a detailed block diagram of the reception signal amplifier illustrated in FIG. 1 according to another exemplary embodiment of the present invention.

FIG. 4 is a detailed block diagram of the reception signal amplifier illustrated in FIG. 1 according to another exemplary embodiment of the present invention. A reception signal amplifier 72' illustrated in FIG. 4 is similar to the reception signal amplifier 72 illustrated in FIG. 3 in terms of configuration, except that a transmission/reception BPF 727 is provided between the second switch 724 and the radiation element 80 instead of the BPF 726 for reception signal filtering. The configuration of the reception signal amplifier 72' improves spurious emission because a transmission signal passes through the BPF 727.

To prevent a downlink RF transmission signal introduced into an uplink reception path from damaging parts such as the LNA 728, the reception signal amplifiers illustrated in FIGS. 3 and 4 may further include an isolator 729 in the transmission path between the first switch 722 and the LNA 728.

Figure 5:
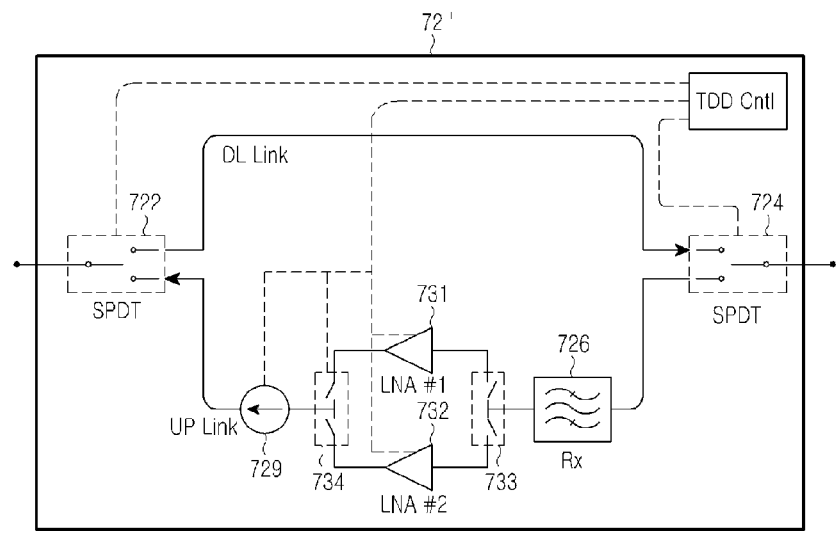
FIG. 5 is a detailed block diagram of the reception signal amplifier illustrated in FIG. 1 according to another exemplary embodiment of the present invention.

FIG. 5 is a detailed block diagram of the reception signal amplifier illustrated in FIG. 1 according to another exemplary embodiment of the present invention. A reception signal amplifier 72" illustrated in FIG. 5 is similar to the reception signal amplifier 72 illustrated in FIG. 3 in terms of configuration, except that an auxiliary LNA 732 is further provided for redundancy in parallel to a main LNA 731. To establish paths between the main LNA 731 and the auxiliary LNA 732, third and fourth switches 733 and 734 may be provided. The MCM 20 provides switching control signals to the third and fourth switches 733 and 734.

Figure 6:
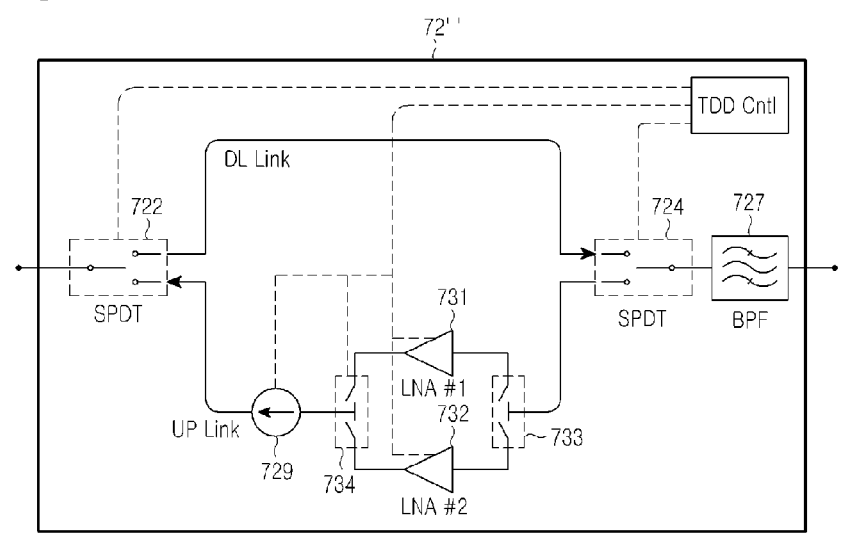
FIG. 6 is a detailed block diagram of the reception signal amplifier illustrated in FIG. 1 according to a further exemplary embodiment of the present invention.

FIG. 6 is a detailed block diagram of the reception signal amplifier illustrated in FIG. 1 according to a further exemplary embodiment of the present invention. A reception signal amplifier 72''' illustrated in FIG. 6 is similar to the reception signal amplifier 72' illustrated in FIG. 4 in terms of configuration, except that the auxiliary LNA 732 is provided for redundancy in parallel to the main LNA 731 as illustrated in FIG. 5 in addition to the structure illustrated in FIG. 4. Like the reception signal amplifier illustrated in FIG. 5, the third and fourth switches 733 and 734 may be provided to establish paths between the LNAs 731 and 732 according to a control signal received from the MCM 20.

Like the reception signal amplifiers illustrated in FIGS. 3 and 4, the isolator 729 may further be provided in the transmission path between the first switch 722 and the fourth switch 734 to prevent a downlink RF transmission signal introduced into an uplink reception path from damaging parts such as the LNA 728 and the switches 733 and 734.

While the BS antenna is directly connected to the BTS, without including a TMA in the exemplary embodiments of the present invention, to which the present invention is not limited, those skilled in the art will understand that many modifications can be made within the scope and spirit of the present invention.

Figure 7:
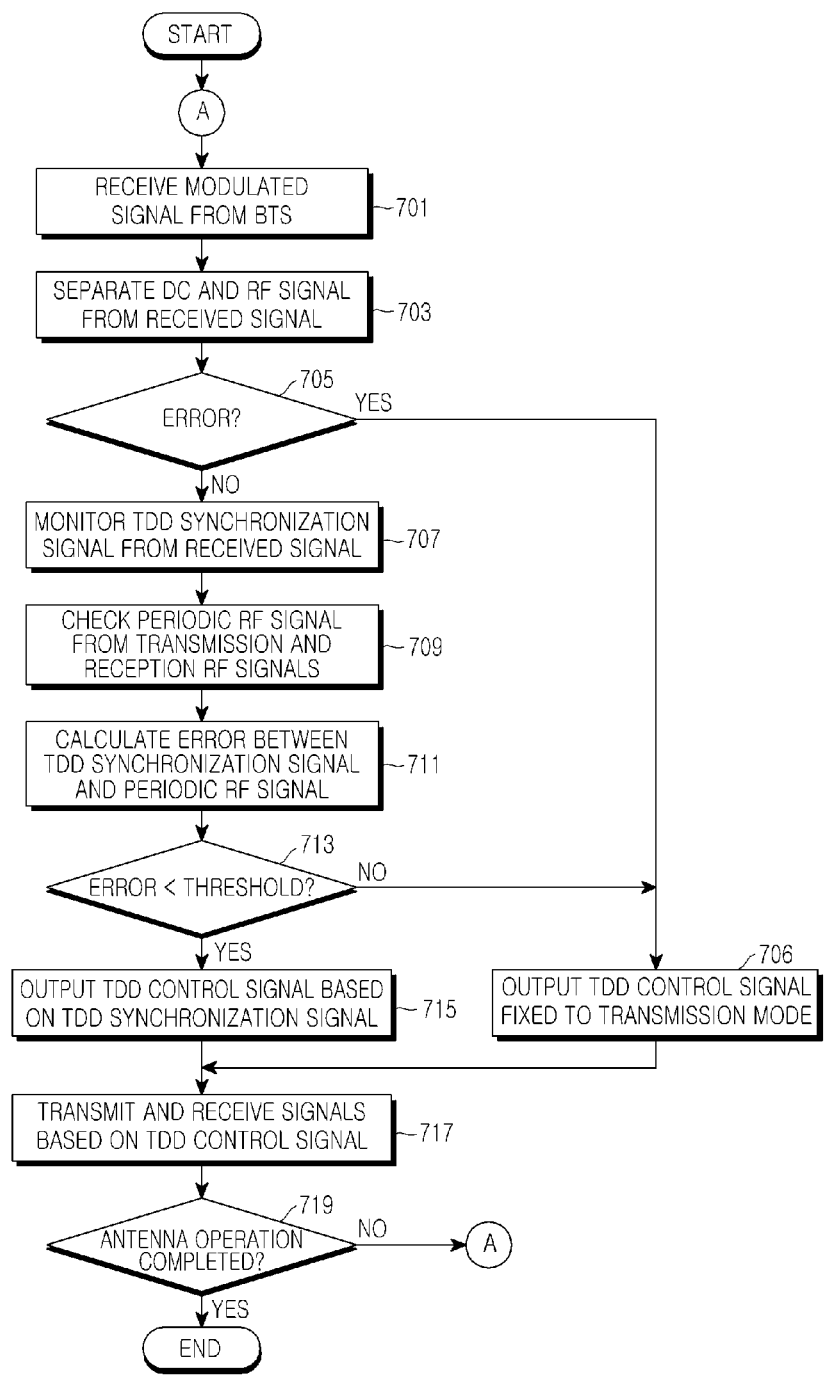
FIG. 7 is a flowchart illustrating a method for controlling the transmission/reception timing of the BS antenna for TDD wireless communications according to an exemplary embodiment of the present invention.

FIG. 7 is a flowchart illustrating a method for controlling the transmission/reception timing of the BS antenna for TDD wireless communications according to an exemplary embodiment of the present invention.

Referring to FIG. 7, the BS antenna to which the present invention is applied receives an amplified signal including an RF signal, a control signal for antenna control, and a DC power from the BTS in step 701.

In step 703, the RF signal, the control signal for antenna control, and the DC power are separated from the received signal. The separation may take place in the signal separator 10, and the separated RF signal, control signal, and DC power may be provided to the division/phase shift module 60, the MCM 20, and the DC/DC converter 30, respectively.

Meanwhile, upon receipt of an error occurrence event signal from a monitoring module that senses errors in the BTS and the BS antenna, the MCM 20 which has received the control signal may determine the presence or absence of errors in devices.

When errors occur to the BTS and the BS antenna, the transmission/reception timing of a TDD synchronization signal generated in the BTS is highly probable to have errors. If the BS antenna has errors, RF transmission and reception signals are vulnerable to errors, thus making the transmission/reception timing of a periodic RF signal erroneous. Due to these errors, an amplified downlink RF transmission signal is introduced into the uplink reception path of the reception signal amplification/division module 70 and the isolator or the LNA in the uplink reception path may be damaged. Therefore, it is preferable to perform step 705 of the MCM's monitoring reception of the error occurrence event signal before step 707. Upon sensing errors in step 705, the TDD control signal TDD Cntl is fixed to downlink transmission mode to prevent introduction of the amplified downlink transmission signal into the uplink reception path of the reception signal amplification/division module 70 in step 706. If errors are not sensed in step 705, the procedure goes to step 707.

In step 707, the MCM 20 monitors a TDD synchronization signal from a signal received from the BTS. For example, the BTS may modulate the signal in a modulation scheme such as Amplitude Shift Keying (ASK), Frequency Shift Keying (FSK), Phase Shift Keying (PSK), or the like. Thus, the MCM 20 detects and checks the TDD synchronization signal according to the modulation scheme of the BTS in step 707.

Further, an RF signal transmitted or received through the BS antenna is provided to the MCM 20 through the RF coupler 40 and the RF detector 50 so that the MCM 20 analyses the status of the RF signal and control the phase of the RF signal. Accordingly, the MCM 20 checks the transmission/reception timing of the transmitted or received RF signal (i.e. a periodic RF signal) based on the signal strength of the detected RF signal in step 709. That is, the power of the downlink RF transmission signal is amplified in a power amplifier and the uplink reception signal is relatively weak. Hence, a period for which an RF signal with a strength equal to or larger than a reference strength is introduced into the RF transmission/reception path is determined as a downlink transmission period and a period for which an RF signal with a strength less than the reference strength is introduced into the RF transmission/reception path is determined as an uplink reception period.

Meanwhile, the TDD synchronization signal from the BTS may be asynchronous to an actual transmitted or received RF signal in the BS antenna, as described before with reference to FIG. 2. Therefore, control of the transmission/reception switching of the reception signal amplification/division module 70 based on the TDD synchronization signal leads to introduction of a downlink RF transmission signal into the uplink reception path of the reception signal amplification/division module 70, thereby damaging the isolator or the LNA in the uplink reception path. To prevent the damage, the MCM 20 calculates the error between the TDD synchronization signal and the periodic RF signal in step 711. If the error exceeds a predetermined range (e.g. 0 to 20 s) in step 713, the MCM 20 fixes the TDD control signal, TDD Cntl to the downlink transmission mode in step 706. If the error is within the predetermined range, the MCM 20 outputs the TDD control signal TDD Cntl according to the TDD synchronization signal in step 715.

In step 717, the BS antenna transmits and receives RF signals based on the TDD control signal provided by the MCM 20.

Preferably, the MCM 20 may further perform a step of transmitting a signal indicating the error occurrence in the BS antenna and/or indicating the error beyond the predetermined range to the BTS after step 706.

Steps 710 to 717 may be repeated until the operation of the BS antenna is completed.

While it has been described that if errors occur to the BTS and the BS antenna or an error exceeds a predetermined range, the TDD control signal, TDD Cntl is fixed to the downlink transmission mode in step 706 in the method for controlling the transmission/reception timing of the BS antenna for TDD wireless communications according to the exemplary embodiment of the present invention, to which the present invention is not limited, many modifications can be made. For example, step 706 is intended to prevent damage to devices due to introduction of a downlink RF transmission signal into the uplink reception path of the reception signal amplification/division module 70. Hence, step 706 suffices if the TDD control signal TDD Cntl is generated to prevent the introduction of the downlink RF transmission signal into the uplink reception path.

Also, it has been described that the MCM 20 dynamically changes the TDD control signal TDD Cntl in the presence or errors and/or when an error exceeds a predetermined range in the exemplary embodiment of the present invention, which should not be construed as limiting the present invention. For instance, it can be further contemplated that the MCM 20 provides the same TDD control signal TDD Cntl irrespective of error occurrence and/or an error exceeding the predetermined range and transmits a signal indicating error occurrence and/or an error exceeding the predetermined range.

While it has been described in the exemplary embodiment of the present invention that the dynamic change of the TDD control signal TDD Cntl in the MCM 20 is triggered by error occurrence and/or an error exceeding the predetermined range, to which the present invention is not limited, the MCM 20 may dynamically change the TDD control signal TDD Cntl when it fails to receive the TDD synchronization signal from the BTS. For example, the MCM 20 may provide a TDD control signal TDD Cntl fixed to the downlink transmission mode, upon failing to receive the TDD synchronization signal from the BTS.

As is apparent from the above description, the method for controlling the transmission/reception timing of a BS antenna for TDD wireless communications enables stable control of transmission/reception switching and prevents damage to devices located in an uplink reception path.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

The invention claimed is:

1. A method for controlling a transmission and reception timing of a Base Station (BS) antenna for Time Division Duplexing (TDD) wireless communications, the method comprising:
   separating a control signal and a downlink Radio Frequency (RF) signal from a modulated signal received from a base station;
   monitoring a TDD synchronization signal derived from the received modulated signal; detecting the downlink RF signal in a transmission path of the BS antenna;
   checking a periodic signal derived from at least the detected downlink RF signal and indicating respective downlink RF transmission and uplink RF reception time periods;
   calculating an error comprising a timing difference between the TDD synchronization signal and the periodic signal; and
   outputting at least one transmission and reception switching control signal to a reception signal amplifier that isolates a downlink transmission mode path and prevents introduction of a downlink transmission signal into an uplink reception path containing a reception amplifier and an isolator in response to the error equaling or exceeding a predetermined threshold.

2. The method of claim 1, wherein the outputting of a transmission and reception switching control signal comprises:
   outputting a transmission and reception switching control signal based on the TDD synchronization signal, if the error is less than the predetermined threshold; and
   outputting a transmission and reception switching control signal fixed to a downlink transmission timing, if the error is equal to or larger than the predetermined threshold.

3. The method of claim 1, further comprising determining whether errors have occurred to the base station and the BS antenna, wherein the outputting of a transmission and reception switching control signal comprise outputting the transmission and reception switching control signal, further taking into account the determination.

4. The method of claim 1, wherein the periodic signal checking comprises:
   detecting the downlink transmission and uplink reception RF signals from a signal transmission path; and setting a period for which the detected RF signals have a signal strength equal to or higher than a predetermined value as a downlink transmission period, and setting a remaining period as an uplink reception period.

5. A Base Station (BS) antenna device for Time Division Duplexing (TDD) wireless communications, comprising:
a signal separator for separating a Radio Frequency (RF) signal, a control signal for antenna control, and an operation power from a signal received from a base station;
a division/phase shift module for dividing the RF signal received from the signal separator, shifting a phase of each of the divided signals according to a phase control signal, and outputting the phase-shifted signals to a reception signal amplifier component containing both an uplink reception path and a downlink reception path, the uplink reception path comprising a reception amplifier and an isolator;
an RF coupler disposed in an RF signal path of the BS antenna for coupling at least the downlink RF signal and generating a coupled signal;
an RF detector for detecting at least the downlink RF signal from the coupled signal;
a converter for receiving the operation power from the signal separator and providing the operation power to the reception signal amplifier;
the reception signal amplifier connected to a radiation element of the BS antenna, for amplifying an uplink signal received from the radiation element and outputting the amplified uplink signal; and
a Main Control Module (MCM) for receiving the control signal and the operation power from the signal separator, monitoring a TDD synchronization signal from the control signal, checking a periodic signal derived from at least the downlink RF signal detected by the RF detector, calculating an error between the TDD synchronization signal and the periodic signal, outputting at least one transmission and reception switching control signal that isolates the downlink transmission mode path and prevents introduction of a downlink transmission signal into the uplink reception path in response to the error equaling or exceeding a predetermined threshold.

6. The BS antenna device of claim 5, wherein the MCM outputs a transmission and reception switching control signal based on the TDD synchronization signal, if the error is less than the predetermined threshold, and outputs a transmission and reception switching control signal fixed to a downlink transmission timing, if the error is equal to or larger than the predetermined threshold.

7. The BS antenna device of claim 5, wherein the MCM receives an error occurrence sensing signal from the base station and the reception signal amplifier and outputs the transmission and reception switching control signal, further taking into account whether an error has occurred.

8. The BS antenna device of claim 5, wherein a period for which the detected RF signals have a signal strength equal to or higher than a predetermined value is set as a downlink transmission period, and a remaining period is set as an uplink reception period.

9. The BS antenna device of claim 5, wherein the reception signal amplifier transmits a downlink transmission signal to the radiation element and comprises:
a first switch for switching to a transmission or reception path according to the transmission and reception switching control signal;
a second switch connected to the radiation element, for switching to the transmission or reception path according to the transmission and reception switching control signal, wherein the first and second switches close the downlink transmission mode path;
a Band Pass Filter (BPF) for receiving a signal from the second switch and filtering a frequency of a predetermined reception band during reception; and
the reception amplifier is a Low Noise Amplifier (LNA) for low-noise-amplifying a signal received from the BPF and outputting the low-noise-amplified signal to the first switch.

10. The BS antenna device of claim 5, wherein the reception signal amplifier transmits a downlink transmission signal to the radiation element and comprises:
a first switch for switching to a transmission or reception path according to the transmission and reception switching control signal;
a band pass filter (BPF) connected to the radiation element, for passing a frequency of transmission and reception bands;
a second switch connected to the BPF, for switching to the transmission or reception path according to the transmission and reception switching control signal; and
the reception amplifier is a low noise amplifier (LNA) for receiving a signal from the second switch, low-noise-amplifying the received signal, and outputting the low-noise-amplified signal to the first switch.

11. The BS antenna device of claim 9, further comprising an isolator between the first switch and the LNA.

12. The BS antenna device of claim 11, further comprising: at least one auxiliary LNA connected to the LNA in parallel, for redundancy; and an auxiliary switch structure for establishing a path between the LNA and the at least one auxiliary LNA.

13. The BS antenna device of claim 12, further comprising an isolator between the first switch and the auxiliary switch structure.

14. The BS antenna device of claim 12, further comprising an isolator between the first switch and the LNA.

15. The BS antenna device of claim 7, wherein the MCM receives an error occurrence sensing signal from the base station and the reception signal amplifier and outputs the transmission and reception switching control signal, further taking into account whether an error has occurred.

16. The BS antenna device of claim 5, wherein the MCM receives an error occurrence sensing signal from the base station and the reception signal amplifier and outputs the transmission and reception switching control signal, further taking into account whether an error has occurred.

17. The BS antenna device of claim 15, further comprising an isolator between the first switch and the auxiliary switch structure.

18. A system for controlling a transmission and reception timing of a Base Station (BS) antenna for Time Division Duplexing (TDD) wireless communications, comprising:
at least one control module for,
separating a control signal and a downlink Radio Frequency (RF) signal from a modulated signal received from a base station;
monitoring a TDD synchronization signal derived from the received modulated signal;
detecting the downlink RF signal in a transmission path of the BS antenna;
checking a periodic signal derived from at least the detected downlink RF signal and indicating respective downlink RF transmission and uplink RF reception time periods;

calculating an error comprising a timing difference between the TDD synchronization signal and the periodic signal; and outputting at least one transmission and reception switching control signal to a reception signal amplifier that isolates a downlink transmission mode path and prevents introduction of a downlink transmission signal into an uplink reception path containing a reception amplifier and an isolator in response to the error equaling or exceeding a predetermined threshold.

* * * * *